(12) United States Patent
Matsumoto

(10) Patent No.: US 11,742,763 B2
(45) Date of Patent: Aug. 29, 2023

(54) SWITCHING CONTROL CIRCUIT AND POWER SUPPLY CIRCUIT

(71) Applicant: FUJI ELECTRIC CO., LTD., Kawasaki (JP)

(72) Inventor: Shinji Matsumoto, Matsumoto (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 354 days.

(21) Appl. No.: 17/183,421

(22) Filed: Feb. 24, 2021

(65) Prior Publication Data

US 2021/0184585 A1 Jun. 17, 2021

Related U.S. Application Data

(63) Continuation of application No. PCT/JP2020/003658, filed on Jan. 31, 2020.

(30) Foreign Application Priority Data

Mar. 29, 2019 (JP) .................................. 2019-068517

(51) Int. Cl.
*H02M 3/335* (2006.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 1/0035* (2021.05)

(58) Field of Classification Search
CPC .................... H02M 3/33569; H02M 1/0035
See application file for complete search history.

(56) References Cited

U.S. PATENT DOCUMENTS 9,847,711 B2 12/2017 Nishijima
10,491,127 B2 * 11/2019 Hara .................... H02M 3/1563
(Continued)

FOREIGN PATENT DOCUMENTS

JP 2012-105424 A 5/2012
JP 2013-188082 A 9/2013
(Continued)

OTHER PUBLICATIONS

International Search Report for PCT/JP2020/003658, dated Apr. 7, 2020.

*Primary Examiner* — Kyle J Moody
(74) *Attorney, Agent, or Firm* — Rabin & Berdo, P.C.

(57) ABSTRACT

A power supply circuit generating an output voltage at a target level and applying the output voltage to a load. The power supply circuit includes a transformer including a primary coil, a secondary coil and an auxiliary coil, a transistor coupled to the primary coil, and a switching control circuit configured to control switching of the transistor based on a voltage from the auxiliary coil. The switching control circuit includes a determination circuit configured to determine whether to shift to a burst mode operation based on whether the load is a light load, and a burst control circuit. The burst control circuit has a clock circuit configured to measure a stop period during which the switching of the transistor is stopped in the burst mode operation, and a control circuit configured to, upon detecting that the stop period is longer than a first time period, perform control to decrease the stop period.

10 Claims, 8 Drawing Sheets

(56) References Cited

U.S. PATENT DOCUMENTS

| | | | |
|---|---|---|---|
| 11,398,767 B2* | 7/2022 | Degen | H02M 3/33569 |
| 11,437,913 B2* | 9/2022 | Kobayashi | H02M 3/33569 |
| 2013/0236203 A1 | 9/2013 | Nakajima et al. | |
| 2016/0268901 A1 | 9/2016 | Nishijima | |
| 2017/0176918 A1 | 6/2017 | Shimura et al. | |

FOREIGN PATENT DOCUMENTS

| | | |
|---|---|---|
| JP | 2016-111758 A | 6/2016 |
| JP | 2017-050902 A | 3/2017 |
| JP | 2017-073867 A | 4/2017 |
| JP | 2017-112798 A | 6/2017 |
| JP | 2017-147854 A | 8/2017 |

* cited by examiner

SWITCHING CONTROL CIRCUIT AND POWER SUPPLY CIRCUIT

CROSS-REFERENCE TO RELATED APPLICATIONS

This is a continuation application of International Patent Application No. PCT/JP2020/003658 filed Jan. 31, 2020, which claims the benefit of priority to Japanese Patent Application No. 2019-068517 filed Mar. 29, 2019, the entire contents of each of which the entire contents of each of which are incorporated herein by reference.

BACKGROUND

Technical Field

The present disclosure relates to a switching control circuit and a power supply circuit.

Description of the Related Art

Switching power supply circuits includes a circuit that intermittently stops a switching operation, in other words, a circuit that operates in a burst mode, to increase efficiency in a light load condition (for example, Japanese Patent Application Publication No. 2017-147854).

Generally, a voltage generated in an auxiliary coil is supplied, as a power supply voltage, to a control circuit of a switching power supply circuit that generates an output voltage using a transformer including a primary coil, a secondary coil, and an auxiliary coil.

When a stop period of the switching operation increases to increase efficiency in the light load condition in such a switching power supply circuit, energy stored in the auxiliary coil decreases. As a result, the power supply voltage generated in the auxiliary coil drops, and the control circuit may not normally operate.

The present disclosure is directed to provision of a switching power supply circuit capable of increasing efficiency in a light load condition while stably operating the switching power supply circuit.

SUMMARY

A primary aspect of the present disclosure is a switching control circuit for controlling a power supply circuit that includes a transformer including a primary coil provided on a primary side thereof, a secondary coil provided on a secondary side thereof, and an auxiliary coil magnetically coupled to the primary coil or the secondary coil, and a transistor coupled to the primary coil, the switching control circuit being configured to operate based on a voltage from the auxiliary coil and control switching of the transistor, such that the power supply circuit generates an output voltage at a target level on the secondary side and applies the output voltage to a load, the switching control circuit comprising: a determination circuit configured to determine whether to shift to a burst mode operation based on whether the load is a light load; and a burst control circuit having: a clock circuit configured to measure a stop period during which the switching of the transistor is stopped in the burst mode operation; and a control circuit configured to, upon detecting that the stop period is longer than a first time period, perform control to decrease the stop period.

A secondary aspect of the present disclosure is a power supply circuit comprising: a transformer including a primary coil provided on a primary side thereof, a secondary coil provided on a secondary side thereof, and an auxiliary coil magnetically coupled to the primary coil or the secondary coil, the power supply circuit generating an output voltage at a target level on the secondary side and applying the output voltage to a load; a transistor coupled to the primary coil; and a switching control circuit configured to control switching of the transistor based on a voltage from the auxiliary coil, the switching control circuit including a determination circuit configured to determine whether to shift to a burst mode operation based on whether the load is a light load, and a burst control circuit having: a clock circuit configured to measure a stop period during which switching of the transistor is stopped in the burst mode operation, and a control circuit configured to, upon detecting that the stop period is longer than a first time period, perform control to decrease the stop period.

DETAILED DESCRIPTION

At least following matters will become clear from the descriptions of the present specification and the accompanying drawings.

Embodiment of the Present Disclosure

<<<Outline of Switching Power Supply Circuit 10>>>

Figure 1:
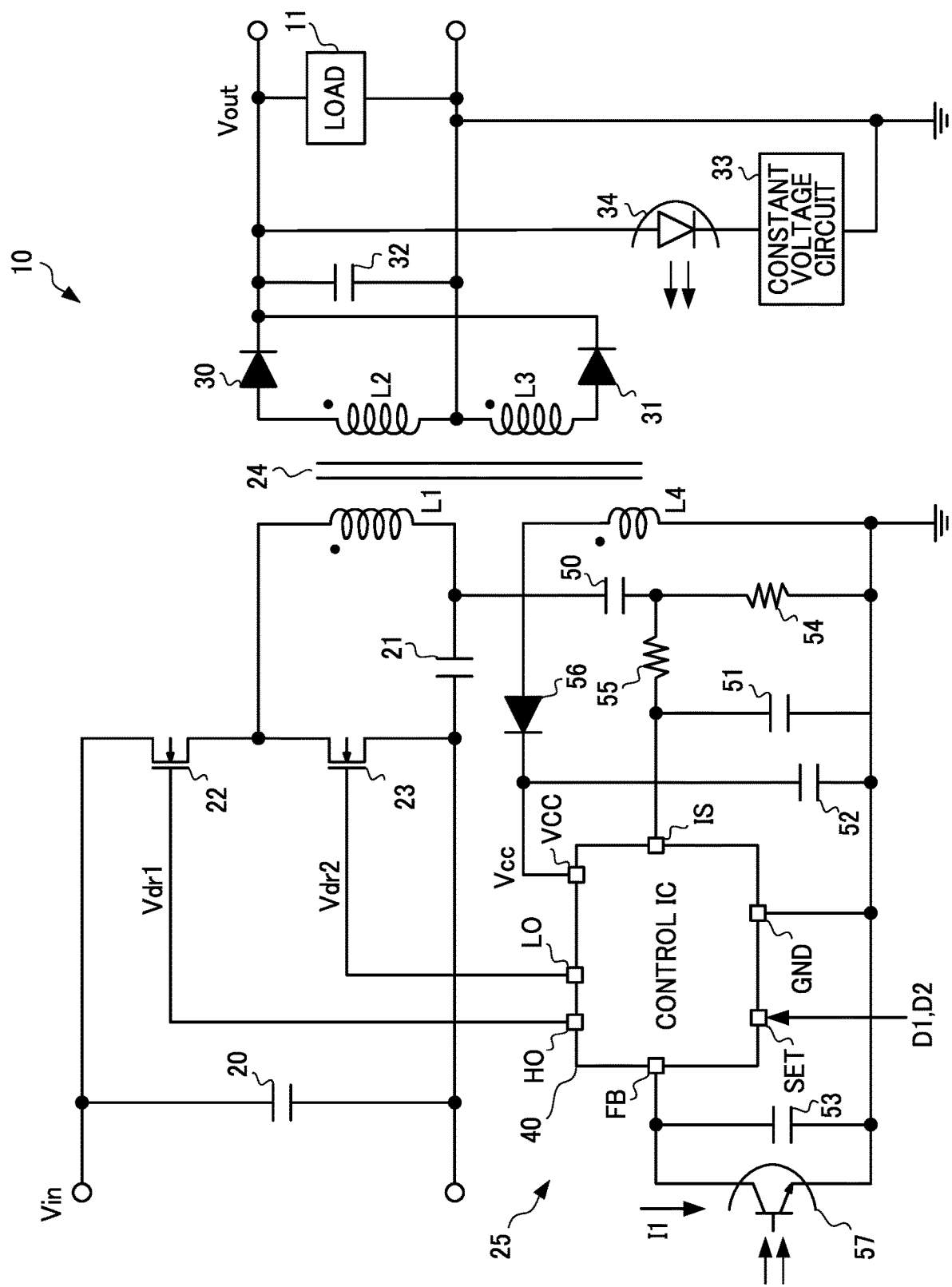
FIG. 1 is a diagram illustrating an example of a switching power supply circuit 10.

FIG. 1 is a diagram illustrating a configuration of a switching power supply circuit 10 according to an embodiment of the present disclosure. The switching power supply circuit 10 is an LLC current resonant converter that generates an output voltage Vout of a target level at a load 11 from a predetermined input voltage Vin.

The switching power supply circuit 10 comprises capacitors 20, 21, 32, the NMOS transistors 22, 23, a transformer 24, a control block 25, diodes 30, 31, a constant voltage circuit 33, and a light-emitting diode 34.

The capacitors 20, 21 stabilize a voltage between a power supply line to which the input voltage Vin is applied and a ground line on the ground side, to remove noise and the like. The input voltage Vin is a direct current voltage at a predetermined level.

The NMOS transistor 22 is a high-side power transistor, and the NMOS transistor 23 is a low-side power transistor. Although the NMOS transistors 22 and 23 are used as a switching device in an embodiment of the present disclosure, for example, a PMOS transistor, a bipolar transistor, or an Insulated Gate Bipolar Transistor (IGBT) may be used.

The transformer 24 comprises the primary coil L1, the secondary coils L2 and L3, and an auxiliary coil L4, where the primary coil L1, the secondary coils L2 and L3, and the auxiliary coil L4 are insulated from one another. In the transformer 24, a voltage is generated in the secondary coils L2 and L3 on the secondary side according to a variation in the voltage across the primary coil L1 on the primary side, and a voltage is generated in the auxiliary coil L4 on the primary side according to a variation in the voltage of the secondary coils L2 and L3.

The primary coil L1 has one end connected with a source of the NMOS transistor 22 and the drain of the NMOS transistor 23, and the other end connected with a source of the NMOS transistor 23 through the capacitor 21.

Accordingly, when the switching of the NMOS transistors 22 and 23 is started, the voltage of the secondary coils L2 and L3 and the voltage of the auxiliary coil L4 varies. The primary coil L1 and the secondary coils L2 and L3 are electromagnetically coupled with the same polarity, and the secondary coils L2 and L3 and the auxiliary coil L4 are also electromagnetically coupled with the same polarity.

The control block 25 is a circuit block that controls the switching of the NMOS transistors 22 and 23, and the details thereof will be described later in detail.

The diodes 30 and 31 rectify the voltage of the secondary coils L2 and L3, and the capacitor 32 smooths the rectified voltage. Consequently, the smoothed output voltage Vout is generated in the capacitor 32. Note that the output voltage Vout results in a direct current voltage at the target level.

The constant voltage circuit 33 generates a constant direct current voltage, and is configured with a shunt regulator, for example.

The light-emitting diode 34 is a device that emits light having an intensity according to a difference between the output voltage Vout and an output of the constant voltage circuit 33, and constitutes a photo coupler with a phototransistor 57 which will be described later. In an embodiment of the present disclosure, when the level of the output voltage Vout rises, the intensity of the light from the light-emitting diode 34 increases.

<<<Control Block 25>>>

The control block 25 includes a control IC 40, capacitors 50 to 53, resistors 54, 55, a diode 56, and the phototransistor 57.

The control IC 40 (switching control circuit) is an integrated circuit that controls the switching of the NMOS transistors 22 and 23 and includes terminals VCC, GND, SET, FB, IS, HO, and LO.

The terminal VCC is a terminal to which a power supply voltage Vcc for operating the control IC 40 is applied. The terminal VCC is connected with one end of the capacitor 52 having the other end grounded and with a cathode of the diode 56. Accordingly, the capacitor 52 is charged with a current from the diode 56, and the charge voltage of the capacitor 52 results in the power supply voltage Vcc for operating the control IC 40. The control IC 40 is activated upon application of a divided voltage of the input voltage Vin through a terminal not illustrated, and after activation, the control IC 40 operates based on the power supply voltage Vcc.

The terminal GND is a terminal to which a ground voltage is applied, and is connected to a housing or the like of a device in which the switching power supply circuit 10 is provided, for example.

The terminal SET is, for example, a terminal to which data D1, D2 from a microcomputer (not illustrated) are inputted. Note that the data D1, D2 will be described later, but are data for setting a resistance value within a control IC 40, values of various voltages, and the like, for example.

The terminal FB is a terminal at which a feedback voltage Vfb according to the output voltage Vout is to be generated, and to which the capacitor 53 and the phototransistor 57 are connected. The capacitor 53 is provided to remove noise between the terminal FB and the ground, and the phototransistor 57 allows a bias current I1 having a magnitude according to the intensity of the light emitted from the light-emitting diode 34 to flow from the terminal FB to the ground. Thus, the phototransistor 57 operates as a transistor that generates a sink current.

The terminal IS is a terminal to which a voltage according to the input power of the switching power supply circuit 10 is inputted. Here, a voltage according to the current value of the resonant current in the primary coil L1 is generated at a node at which the capacitor 50 and the resistor 54 are connected. The resistor 55 and the capacitor 51 constitute a low-pass filter. Thus, a voltage, with its noise removed, according to the current value of the resonant current in the primary coil L1 is applied to the terminal IS. Note that the current value of the resonant current increases with the input power of the switching power supply circuit 10, and the input power of the switching power supply circuit 10 increases with the power consumed in the load 11. Accordingly, a voltage to be applied to the terminal IS indicates a voltage corresponding to the consumed power in the load 11.

The terminal HO is a terminal from which a drive signal Vdr1 for driving the NMOS transistor 22 is outputted, and to which the gate of the NMOS transistor 22 is connected.

The terminal LO is a terminal from which a drive signal Vdr2 for driving the NMOS transistor 23 is outputted, and to which the gate of the NMOS transistor 23 is connected.

<<<Details of Control IC 40>>>

Figure 2:
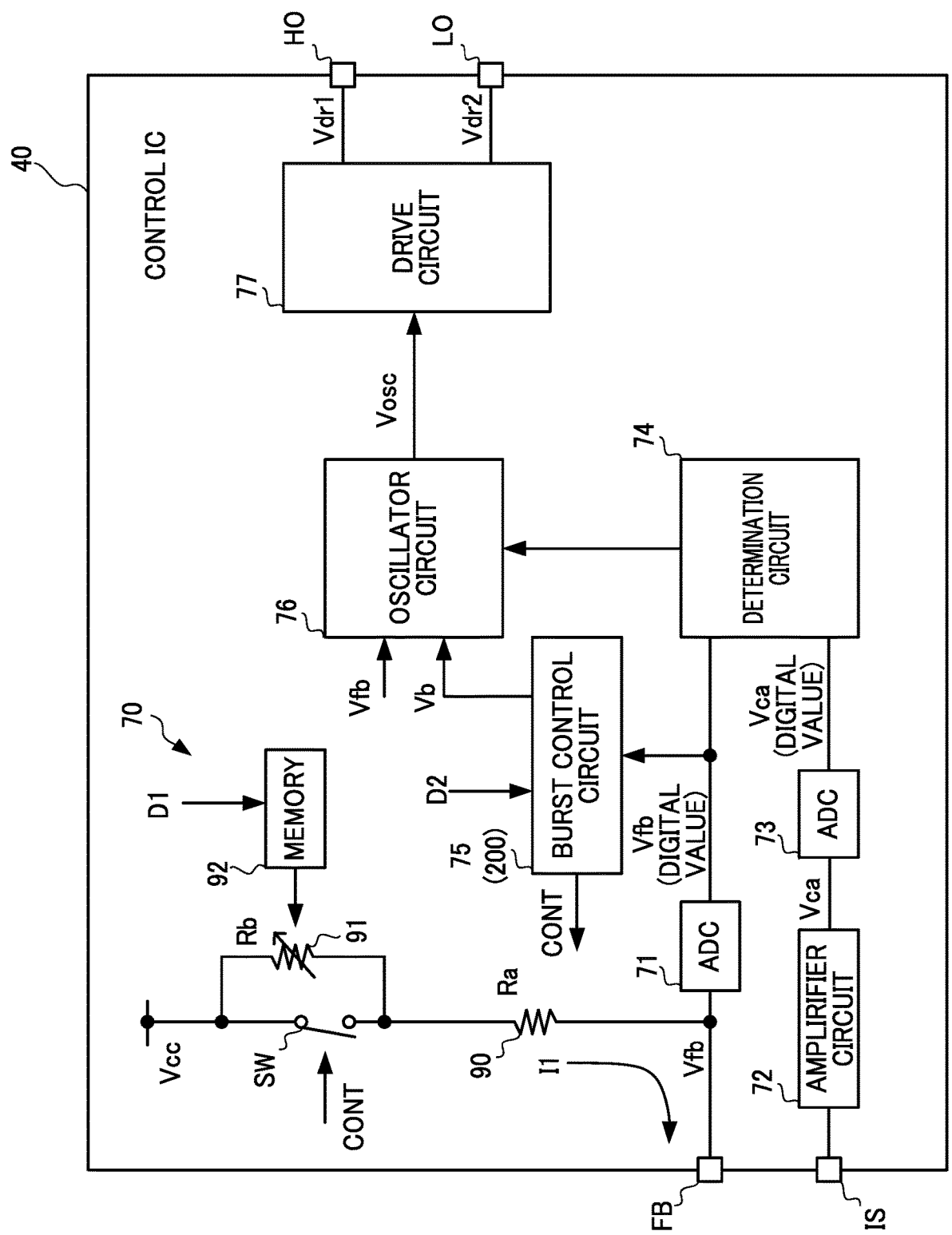
FIG. 2 is a diagram illustrating a configuration of a control IC 40.

FIG. 2 is a diagram illustrating a configuration of the control IC 40. The control IC 40 includes a feedback voltage generating circuit 70, AD converters 71, 73, an amplifier circuit 72, a determination circuit 74, a burst control circuit 75, an oscillator circuit 76, and a drive circuit 77. Note that, here, the terminals VCC, GND, SET are omitted.

The feedback voltage generating circuit 70 generates the feedback voltage Vfb based on the bias current I1 from the phototransistor 57. The feedback voltage generating circuit 70 includes a resistor 90, a variable resistor 91, memory 92, and a switch SW.

The resistor 90 (first resistor) has, for example, a resistance value Ra, and the variable resistor 91 (second resistor) has a resistance value Rb corresponding to the data D1 stored in the memory 92. Note that the resistor 90 and the variable resistor 91 are connected in series.

The memory 92 stores the data D1 specifying the resistance value Rb of the variable resistor 91 inputted from a microcomputer (not illustrated). In an embodiment of the present disclosure, the data D1 is 2-bit data, for example, and thus the resistance value Rb corresponds to the data D1, resulting in any of four types of resistance values Rb1 to Rb4.

The switch SW is tuned on or off in response to a control signal CONT (described later) from the burst control circuit 75. In an embodiment of the present disclosure, when the control signal CONT is at a high level (hereinafter, referred to as a high level or high), the switch SW is on, and when the control signal CONT is at a low level (hereinafter referred to as a low level or low), the switch SW is off. Note that the switch SW is connected in parallel with the variable resistor 91.

Then, a resistance value R of the feedback voltage generating circuit 70 in an on-state of the switch SW results in R=Ra. Meanwhile, the resistance value R of the feedback voltage generating circuit 70 in an off-state of the switch SW results in R=Ra+Rb. In addition, the feedback voltage Vfb to be applied to the terminal FB is given as an expression (1).

$$Vfb = Vcc - R \times I1 \qquad (1)$$

As described above, in an embodiment of the present disclosure, the current value of the bias current I1 increases with a rise in the output voltage Vout. Accordingly, when the output voltage Vout rises, the feedback voltage Vfb drops. When the current value of a bias current I1 is constant, the feedback voltage Vfb in the off-state of the switch SW is smaller than the feedback voltage Vfb in the on-state of the switch SW.

The AD converter 71 converts the feedback voltage Vfb at the terminal FB into a digital value and outputs the resultant. The amplifier circuit 72 amplifies a voltage corresponding to the current flowing through the load 11 which is applied to the terminal IS, and outputs the resultant as a voltage Vca. In addition, the AD converter 73 converts the voltage Vca into a digital value and outputs the resultant.

The determination circuit 74 determines whether the load 11 is a light load based on the feedback voltage Vfb and the voltage Vca. In other words, the determination circuit 74 determines whether a current value of the current flowing through the load 11 is smaller than a predetermined value (for example, 1 mA) indicating a light load.

Here, when the load 11 becomes a light load, the output voltage Vout rises above the target level. Then, an internal input to the constant voltage circuit 33, which is configured with a shunt regulator, for example, rises, and thus a large amount of current is passed through a transistor inside a shunt regulator not illustrated such that the output is to be constant.

As a result, a large amount of current flows also through the light-emitting diode 34. Then, the phototransistor 57 causes the bias current I1 having a magnitude according to the degree of amplification of the light from the light-emitting diode 34 to flow from the terminal FB to the ground, thereby dropping the feedback voltage Vfb.

The determination circuit 74 determines a shift from a normal mode to a burst mode based on whether the load 11 is a light load. For example, the determination circuit 74 determines that the load 11 is a light load and a shift to the burst mode, when the inputted feedback voltage Vfb is lower than the feedback voltage Vfb at a time when the output voltage Vout is at the target level as well as the inputted voltage Vca is smaller than a predetermined value that serves as the criterion of a light load.

In addition, the determination circuit 74 determines that the load 11 is not a light load and a shift to the normal mode, when the inputted feedback voltage Vfb is higher than the feedback voltage Vfb at the time when the output voltage Vout is at the target level or the inputted voltage Vca is greater than the predetermined value that serves as the criterion of a light load.

It may be assumed that the determination circuit 74 determines a shift from the normal mode to the burst mode based on at least one of the feedback voltage Vfb and the voltage Vca. Specifically, the determination circuit 74 may determine whether the load 11 is a light load to determine a shift to the burst mode only based on the voltage Vca, for example.

Note that the "normal mode" is a mode in which a switching operation is continuously performed without being intermittently stopped, for example, and the "burst mode" is a mode in which the switching operation is intermittently stopped, for example. Further, when the switching power supply circuit 10 is operating in the normal mode, the switching power supply circuit 10 is not operating in the burst mode. Thus, when a normal mode operation is performed, a burst mode operation is not performed. Further, when the switching power supply circuit 10 is operating in the normal mode, the control signal CONT is high, the switch SW is on, and the resistance value R of the feedback voltage generating circuit 70 may be R=Ra.

The burst control circuit 75 outputs a voltage Vb for intermittently stopping the switching operation to the oscillator circuit 76 when the load 11 is a light load. Note that the burst control circuit 75 will be described later in detail.

The oscillator circuit 76 is a voltage control oscillator circuit that outputs an oscillator signal Vosc for switching the NMOS transistors 22, 23 in response to the inputted feedback voltage Vfb or voltage Vb. The oscillator circuit 76 operates in response to the feedback voltage Vfb, when it is determined that the load 11 is not a light load, in other words, the normal mode operation is performed.

In contrast, the oscillator circuit 76 operates in response to the voltage Vb, when it is determined that the load 11 is a light load, in other words, the burst mode operation is performed. Note that the oscillator circuit 76 outputs the oscillator signal Vosc having a high frequency when the level of the inputted voltage becomes low. Further, the oscillator circuit 76 stops outputting the oscillator signal Vosc when receiving a voltage having a predetermined level or higher, for example.

The drive circuit 77 switches the NMOS transistors 22, at the frequency of the oscillator signal Vosc. Specifically, the drive circuit 77 outputs the pulsed drive signals Vdr1, Vdr2 having the frequency of the oscillator signal Vosc with a duty ratio that is constant in principle (for example, 50%) to the NMOS transistors 22, 23, respectively. Note that the drive circuit 77 complementarily changes the drive signal Vdr1 and the drive signal Vdr2 while providing a dead time, so as to prevent the NMOS transistors 22, 23 from being on at the same time.

Here, in the normal mode operation, when the level of the output voltage Vout rises above the target level, the feedback voltage Vfb drops, and thus the frequency of the oscillator signal Vosc rises. As a result, the output voltage Vout of the switching power supply circuit 10, which is an LLC current resonant converter, drops. In contrast, when the level of the output voltage Vout drops below the target level, the feedback voltage Vfb rises, and thus the frequency of the oscillator signal Vosc drops. As a result, the output voltage Vout of the switching power supply circuit 10 rises. Accordingly, the switching power supply circuit 10 can generate the output voltage Vout at the target level in the normal mode operation.

<<<Details of Burst Control Circuit 75>>>

Figure 3:
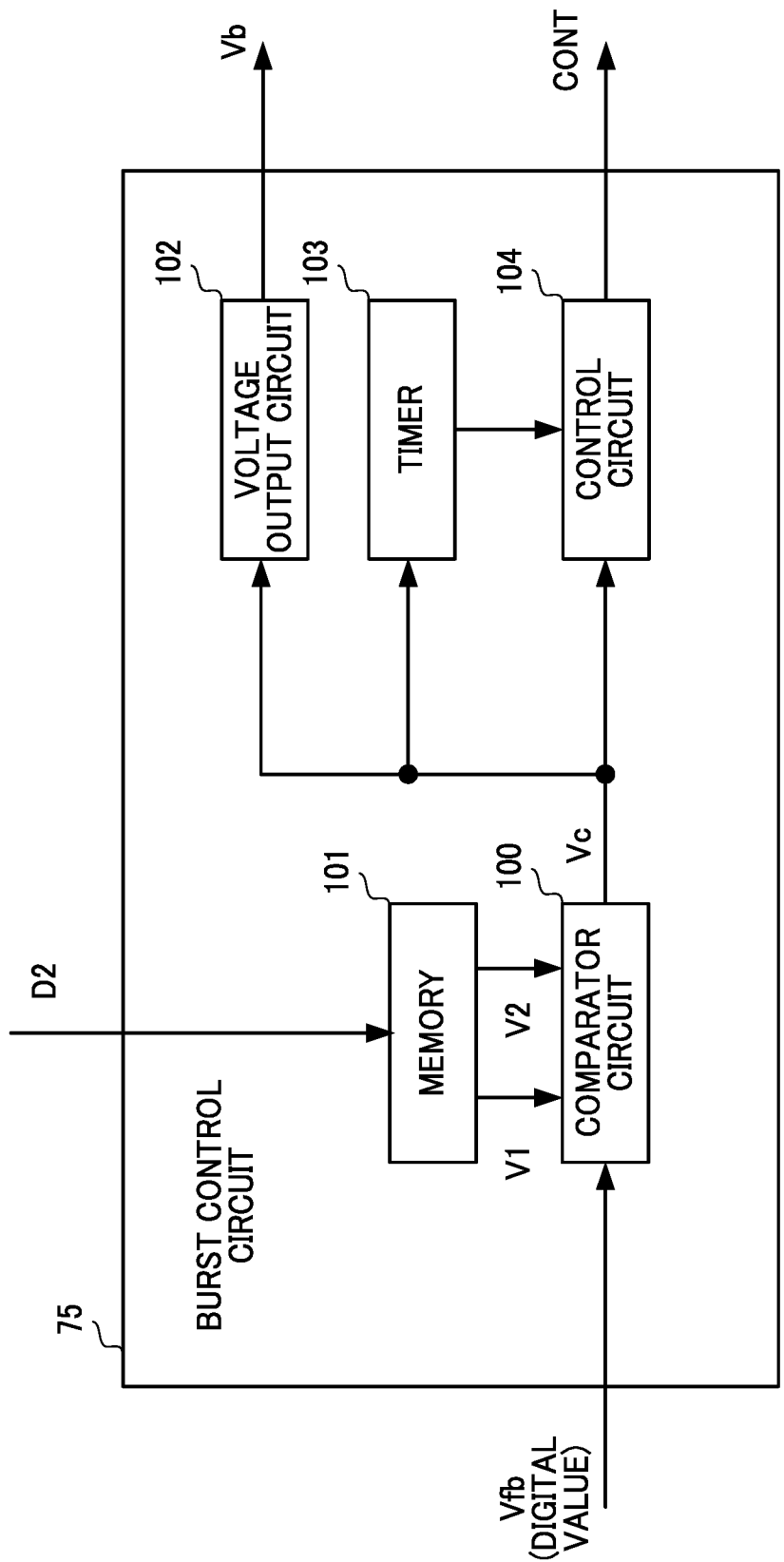
FIG. 3 is a diagram illustrating a configuration of a burst control circuit 75.

Here, the burst control circuit 75 will be described in detail with reference to FIG. 3. The burst control circuit 75 outputs the voltage Vb for intermittently stopping the switching operation and the control signal CONT for determining a time period during which the switching operation is to be stopped. The burst control circuit 75 includes a comparator circuit 100, memory 101, a voltage output circuit 102, a timer 103, and a control circuit 104.

The comparator circuit 100 is a hysteresis comparator that compares a voltage V1 (first voltage), which is a higher threshold voltage, and the feedback voltage Vfb, as well as a voltage V2 (second voltage), which is a lower threshold voltage, and the feedback voltage Vfb. The comparator circuit 100 changes a voltage Vc indicating a comparison result to "high" when the feedback voltage Vfb rises above the voltage V1, and changes the voltage Vc to "low" when the feedback voltage Vfb drops below the voltage V2 (voltage V2<voltage V1).

The memory 101 stores the voltages V1 and V2, which are subjected to the comparison in the comparator circuit 100, based on the data D2 for setting the voltages V1, V2. Note that the levels of the voltages V1, V2 change with the value of the data D2.

The voltage output circuit 102 outputs the voltage Vb for generating the oscillator signal Vosc having a predetermined frequency when the voltage Vc goes "high", and outputs the voltage Vb for stopping the generation of the oscillator signal Vosc when the voltage Vc goes "low". In other words, the voltage output circuit 102 changes the level of the voltage Vb in response to the logic level of the voltage Vc. Accordingly, when the voltage Vc is "high", the NMOS transistors 22, 23 are switched at the predetermined frequency, and when the voltage Vc is "low", the switching of the NMOS transistors 22, 23 is stopped. A configuration may be such that when the feedback voltage Vfb rises and the voltage Vc goes "high", the voltage output circuit 102 changes the level of the voltage Vb according to the magnitude of the feedback voltage Vfb.

The timer 103 (clock circuit) measures a time period during which the switching of the NMOS transistors 22, 23 is stopped (hereinafter, referred to as a "stop period") based on the "low" voltage Vc.

The control circuit 104 sets a time period during which the NMOS transistors 22, 23 are switched (hereinafter, referred to as a "switching period") and the "stop period" based on the voltage Vc and the time period measured by the timer 103.

Here, when the switching power supply circuit 10 is operating in the burst mode, it is desirable that the "switching period" is short and the "stop period" is long to the extent that the power supply voltage Vcc will not drop more than necessary, in order to increase efficiency.

In an embodiment of the present disclosure, the "stop period" is a time period from a time when the feedback voltage Vfb reaches the voltage V2 to a time when the feedback voltage Vfb rises to the voltage V1 (>V2), and the "switching period" is a time period from a time when the feedback voltage Vfb reaches the voltage V1 to a time when the feedback voltage Vfb drops to the voltage V2. The feedback voltage Vfb is Vfb=Vcc−R×I1 as given in the Expression (1).

Thus, in the "stop period", when the resistance value R increases, the "stop period" increases, and the resistance value R decreases, the "stop period" decreases. Further, in the "switching period", when the resistance value R decreases, the "switching period" decreases.

Accordingly, the control circuit 104 outputs a signal for reducing the "stop period", in other words, the "high" control signal CONT for reducing the resistance value R, when the "stop period" becomes longer than a predetermined "time period T1". Note that the "time period T1 (first time period)" is 10 ms, for example, and is set based on a time period during which the level of the power supply voltage Vcc drops from the normal level (for example, 5 V) to the lowest level at which the control IC 40 stably operates (for example, 4.5 V) when the switching operation is stopped. Note here that the "normal level" is defined as the level of the power supply voltage Vcc when the switching power supply circuit 10 operates in the normal mode, for example. Further, "the lowest level at which the control IC 40 stably operates" is defined as the level of the power supply voltage Vcc needed for various functions of the control IC 40 to be normally operated, for example.

In addition, the control circuit 104 outputs a signal for increasing the "stop period", in other words, the "low" control signal CONT for increasing the resistance value R, when the "stop period" is shorter than the "time period T2", which is sufficiently short, continuously five times, for example. Note that the "time period T2 (second time period)" is 2 ms, for example, and is shorter than the "time period T1".

Furthermore, a control circuit 140 outputs a signal for reducing the "switching period", in other words, the "high" control signal CONT for reducing the resistance value R, in a time period during which the NMOS transistors 22, 23 are switched. Note that the control circuit 104 includes various types of logic circuits such as a counter (not illustrated), an AND circuit, an NOR circuit, an OR circuit, and the like, and logically synthesizes the output of the counter, the logic level of the voltage Vc, and the like, to generate the desired control signal CONT.

<<<Burst Mode Operation>>>
==T2<Stop Period<T1==

Here, with reference to FIG. 4, a description will be given of an operation of the control IC 40 when the switching power supply circuit 10 operates in the burst mode and, in addition, the "stop period" is longer than the "time period T2" and shorter than the "time period T1". It is assumed that the control circuit 104 is set such that the "low" control signal CONT is to be outputted during the "stop period" upon activation.

First, at time t0, when the feedback voltage Vfb reaches the voltage V2, the voltage Vc goes "low", thereby stopping the switching operation. At this time, the control circuit 104 outputs the "low" control signal CONT to increase the "stop period". As a result, the resistance value R increases to R=Ra+Rb, and thus the feedback voltage Vfb (=Vcc−R×I1) drops sharply.

When the switching operation is stopped at time to, the output voltage Vout drops, and thus the feedback voltage Vfb rises. Then, when the feedback voltage Vfb reaches the voltage V1 at time t1, the voltage Vc goes "high", thereby starting the switching operation. At this time, the control circuit 104 outputs the "high" control signal CONT. As a result, the resistance value R is R=Ra resulting in becoming smaller, and thus the feedback voltage Vfb (=Vcc−R×I1) rises sharply.

Here, when the feedback voltage Vfb has increased at time t1, a time period during which the feedback voltage Vfb drops to the voltage V2, in other words, the "switching period", is expected to become long. However, when the feedback voltage Vfb increases, the bias current I1 of the phototransistor 57 increases, and thus the feedback voltage Vfb drops more sharply. In an embodiment of the present disclosure, assuming that the resistance value is R=Ra, the size of the phototransistor 57 and/or the resistance value Ra, for example, is selected such that the "switching period" is reduced. Accordingly, in an embodiment of the present disclosure, the "switching period" can be reduced.

Then, when the switching operation is started at time t1, the output voltage Vout rises, and thus the feedback voltage Vfb drops. Note that, in an embodiment of the present disclosure, the bias current I1 and the resistance value R are set such that the falling slope of the feedback voltage Vfb is greater than the rising slope thereof. Thus, a time period until the feedback voltage Vfb reaches the voltage V2 results in being sufficiently shorter than the stop period from time t0 to time t1. Then, at time t2 and thereafter, the operation from time t0 to time t1 is repeated.

==Stop Period>T1==

Figure 5:
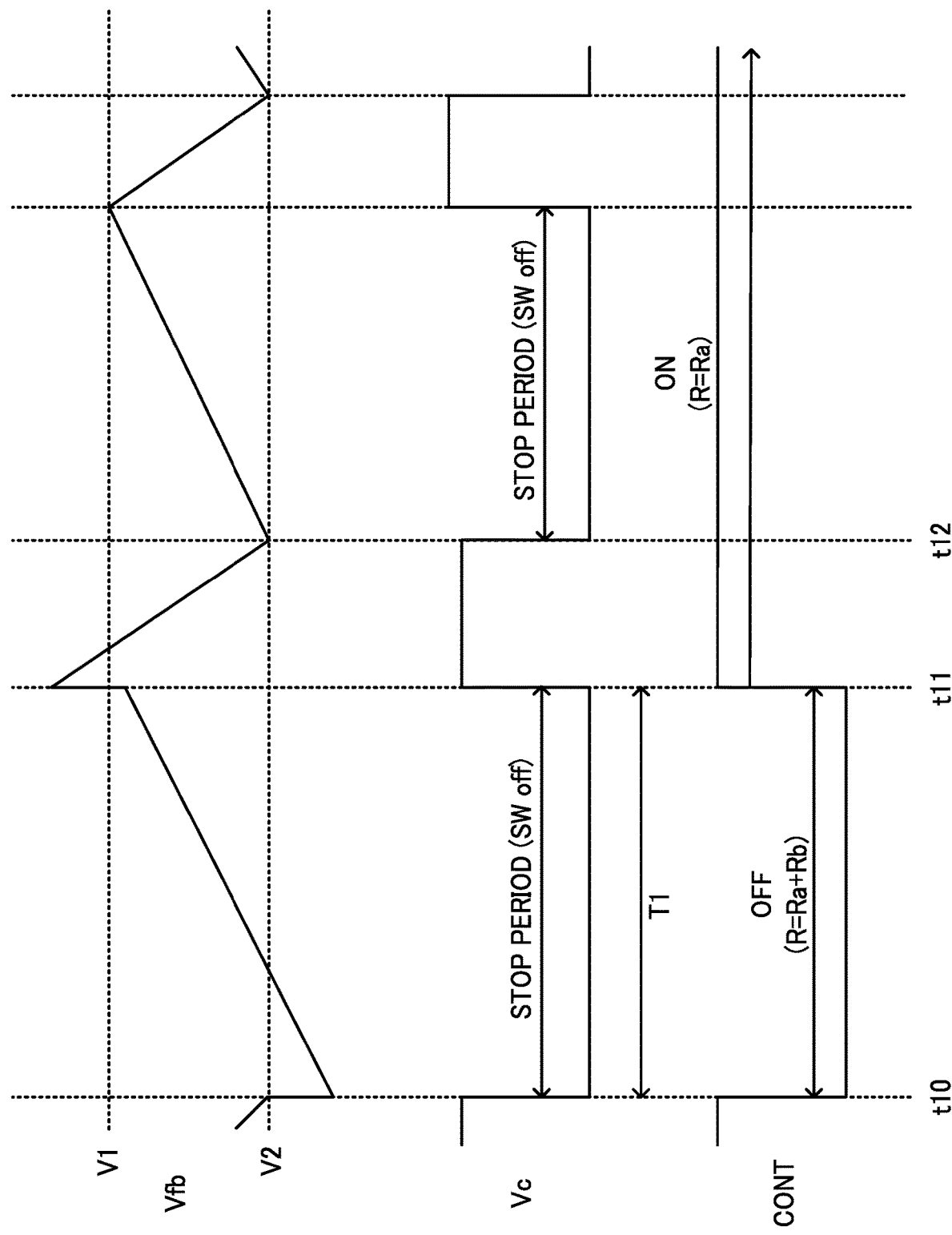
FIG. 5 is a diagram for explaining a burst mode operation.

With reference to FIG. 5, a description will be given of an operation of the control IC 4 when the switching power supply circuit 10 operates in the burst mode and, in addition, the "stop period" is longer than the "time period T1".

First, at time t10, when the feedback voltage Vfb reaches the voltage V2, the voltage Vc goes "low", thereby stopping the switching operation. At this time, the control circuit 104 outputs the "low" control signal CONT to increase the "stop period". As a result, the resistance value R increases to R=Ra+Rb resulting in becoming larger, and thus the feedback voltage Vfb (=Vcc−R×I1) drops sharply.

When the switching operation is stopped at time t10, the output voltage Vout drops, and thus the feedback voltage Vfb rises. Then, at time t11 at which the "time period T1" has elapsed since time t10, the control circuit 104 detects that the "stop period" is longer than the "time period T1". As a result, the control circuit 104 outputs the "high" control signal CONT for reducing the "stop period".

Then, when the control signal CONT goes "high", the resistance value R is R=Ra resulting in becoming smaller, and thus the feedback voltage Vfb (=Vcc−R×I1) rises sharply. As a result, the feedback voltage Vfb becomes higher than the voltage V1 at time til, and thus the voltage Vc goes "high", thereby starting the switching operation.

Then, when the switching operation is started at time t11, the output voltage Vout rises, and thus the feedback voltage Vfb drops. Further, at time t12, when the feedback voltage Vfb reaches the voltage V2, the voltage Vc goes "low", thereby stopping the switching operation. Here, the control circuit 104 detects that the "stop period" is longer than the "time period T1" at time t11, and thus the "high" control signal CONT for reducing the "stop period" is outputted continuously at time t11 and thereafter. In other words, after the level of the feedback voltage changes in response to the control signal CONT, such a condition for changing the voltage is maintained at time 12 and thereafter.

As a result, the resistance value R is maintained at R=Ra, and thus the feedback voltage Vfb rises from the level of the voltage V2. Then, at time t12 and thereafter, the burst mode operation is repeated while maintaining the resistance value R. As such, when it is detected that the "stop period" is longer than the "time period T1", the control circuit 104 changes the level of the feedback voltage Vfb during the "stop period" such that the "stop period" decreases.

==Stop Period<T2==

Figure 6:
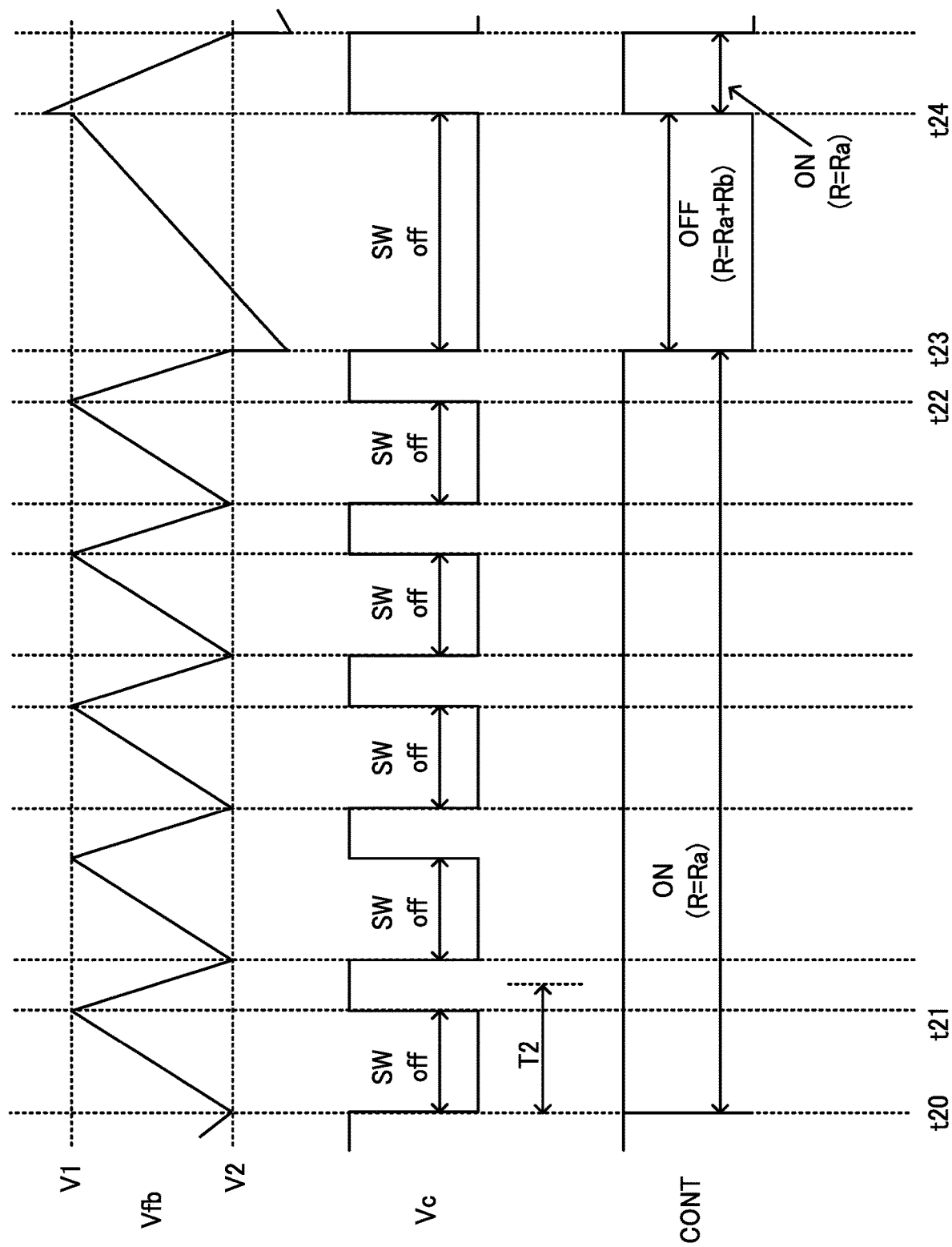
FIG. 6 is a diagram for explaining a burst mode operation.

With reference to FIG. 6, a description will be given of an operation of the control IC 4 when the switching power supply circuit 10 operates in the burst mode and, in addition, the "stop period" is shorter than the "time period T2" five times continuously. It is assumed here that, before and at time t20 in FIG. 6, the control circuit 104 detects that the "stop period" is longer than the "time period T1", and outputs the "high" control signal CONT during the "stop period".

First, at time t20, when the feedback voltage Vfb reaches the voltage V2, the voltage Vc goes "low", thereby stopping the switching operation. Here, the control circuit 104 is outputting the "high" control signal CONT, and thus the resistance value R is maintained at R=Ra. As a result, the feedback voltage Vfb rises from the level of the voltage V2 at time t20.

Then, at time t21 at which a time period shorter than the "time period T2" has elapsed since time t20, the control circuit 104 detects that the "stop period" is shorter than the "time period T2".

Further, when the feedback voltage Vfb reaches the voltage V1 at time t21, the voltage Vc goes "high", thereby starting the switching operation. Here, the control circuit 104 is outputting the "high" control signal CONT, and thus the resistance value R is maintained at R=Ra. As a result, the feedback voltage Vfb drops from the level of the voltage V1 at time t21.

Then, when the control circuit 104 detects that the "stop period" is shorter than the "time period T2" five times at time t22, the control circuit 104 outputs the "low" control signal CONT at time t23, to increase the "stop period". As a result, the resistance value R increases to R=Ra+Rb, and thus the feedback voltage Vfb drops sharply. Accordingly, the "stop period" from time t23 to time t24 results in becoming longer than the "stop period" from time t20 to time t21, for example. Note that, at time t24 and thereafter, the operation illustrated in FIG. 4 is repeated.

As such, in response to a detection result that the "stop period" is shorter than the "time period T2", the control circuit 104 changes the level of the feedback voltage Vfb during the "stop period" such that the "stop period" increases. Accordingly, the control IC 40 is able to increase the "stop period" when the "stop period" is short, thereby increasing the efficiency of the switching power supply circuit 10.

Note that, regardless of whether the "stop period" is shorter than the "time period T2", the maintenance of the "high" control signal CONT may be released. Specifically, the level of the feedback voltage may be changed in response to detecting that the "stop period" is longer than the "time period T1" such that the "stop period" increases. Then, when such a condition for changing the voltage is maintained during a predetermined number of times of the stop periods, the maintenance may be released in a subsequent stop period. In other words, the "low" control signal CONT may be outputted in a subsequent stop period.

Other Embodiments of Burst Control Circuit

Figure 7:
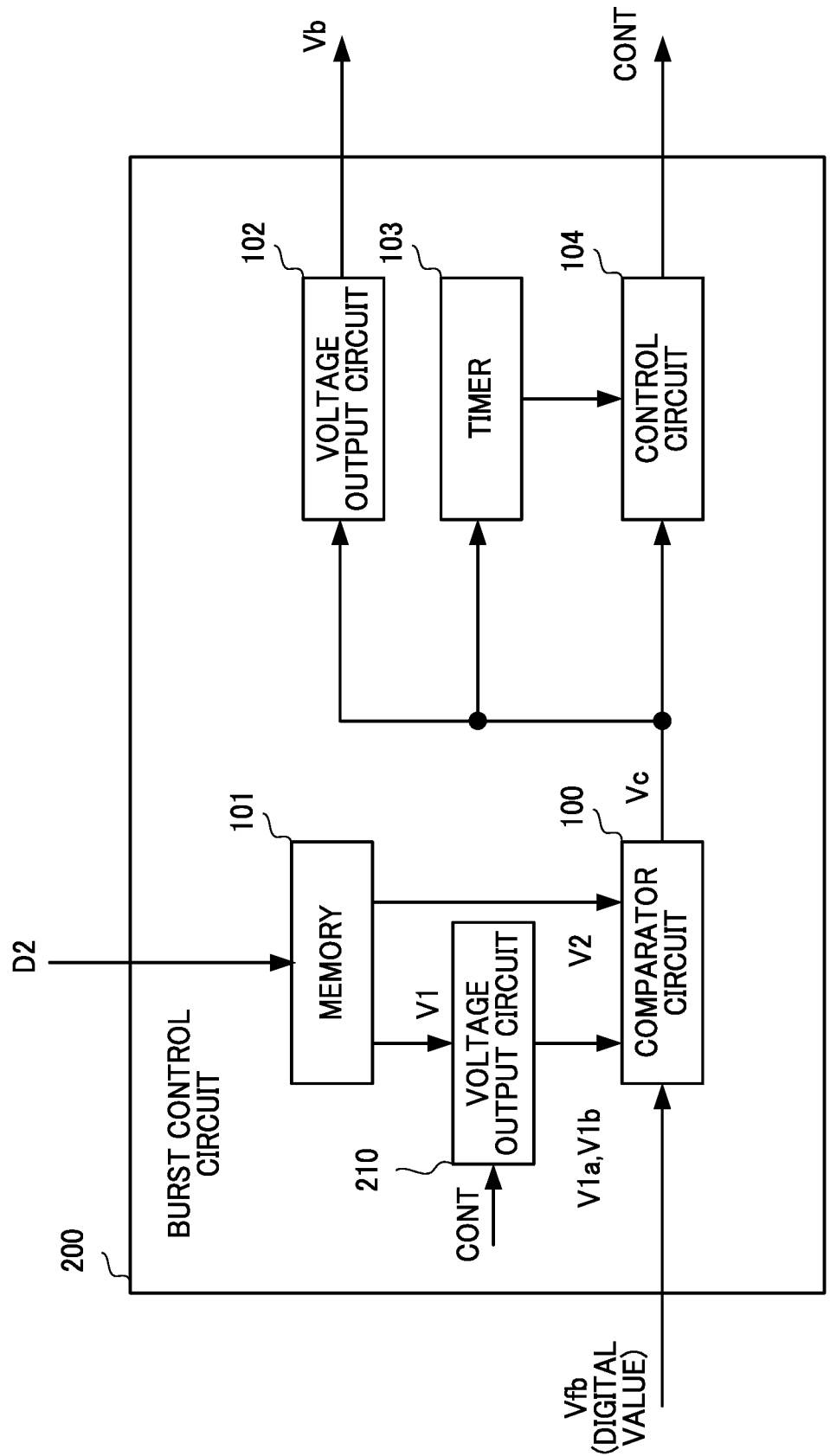
FIG. 7 is a diagram illustrating a configuration of a burst control circuit 200.

FIG. 7 is a diagram illustrating an example of a burst control circuit 200. The burst control circuit 200 includes the comparator circuit 100, the memory 101, the voltage output circuit 102, 210, the timer 103, and the control circuit 104. In the burst control circuit 200, the blocks that are given the same reference numerals as those in the burst control circuit 75 are the same, and thus the voltage output circuit 210 will be described.

When the voltage output circuit 210 receives the "high" control signal CONT for reducing the "stop period", the voltage output circuit 210 outputs the voltage V1b that is lower than the voltage V1. In contrast, when the voltage output circuit 210 receives the "low" control signal CONT for increasing the "stop period", the voltage output circuit 210 outputs the voltage V1a higher than the voltage V1. Then, the comparator circuit 100 compares the feedback voltage Vfb and the voltage V1a, V1b serving as a higher threshold voltage.

Figure 8:
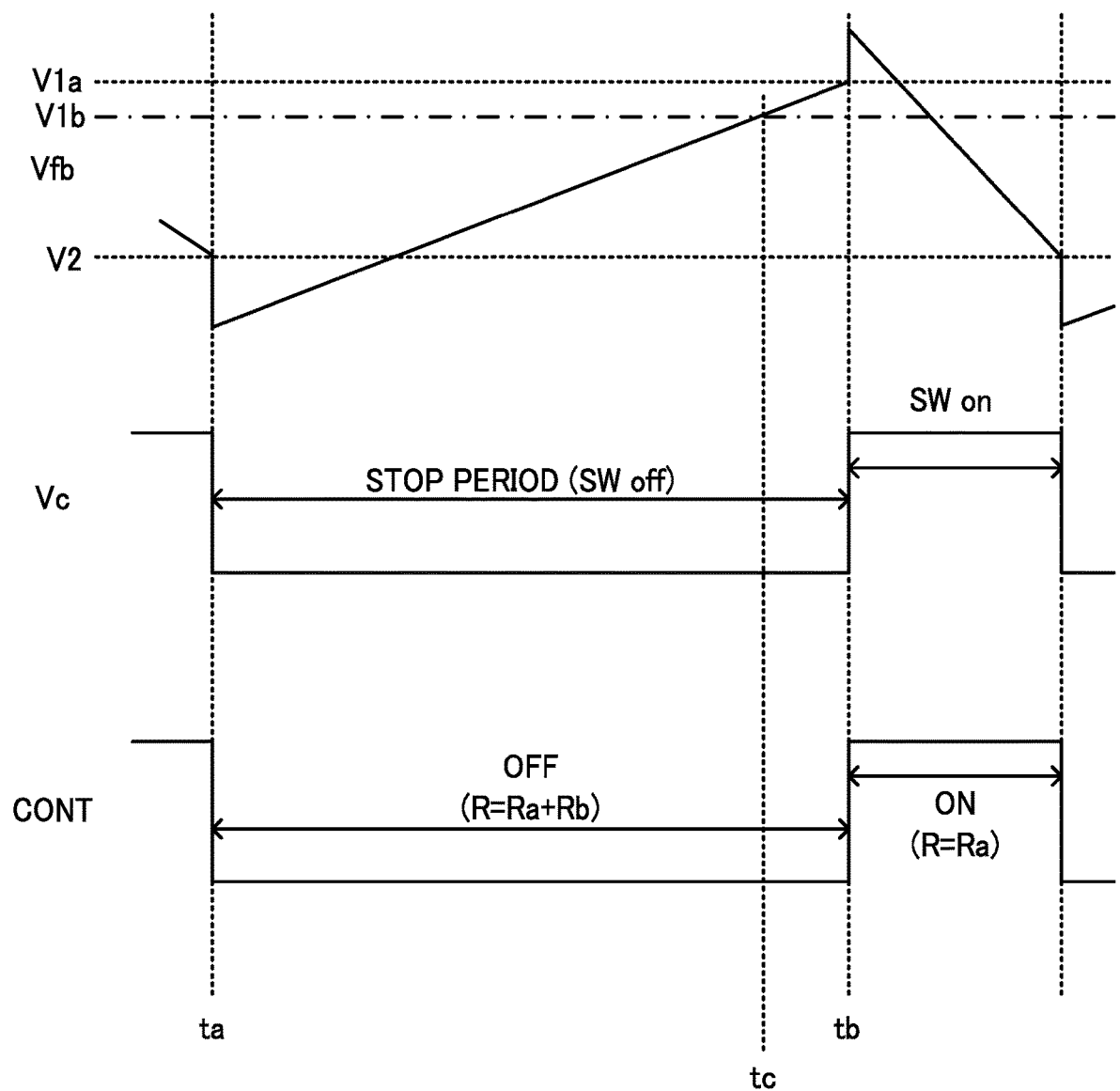
FIG. 8 is a diagram for explaining a burst mode operation.

FIG. 8 is a diagram for explaining the burst mode operation when the burst control circuit 200 is used in the control IC 40. For example, when the feedback voltage Vfb reaches the voltage V2 at time ta, the voltage Vc goes "low", thereby stopping the switching operation. At this time, the control circuit 104 outputs the "low" control signal CONT, and thus the resistance value R increases and the feedback voltage Vfb (=Vcc−R×I1) drops sharply.

When the switching operation is stopped at time ta, the output voltage Vout drops, and thus the feedback voltage Vfb rises. Here, the voltage output circuit 210 outputs the voltage V1a in response to the "low" control signal CONT for increasing the "stop period". Thus, the switching operation will not be started until the feedback voltage Vfb reaches the voltage V1a at time tb.

In contrast, for example, when the voltage output circuit 210 receives the "high" control signal CONT for reducing the "stop period", the voltage output circuit 210 outputs the voltage V1b instead of the voltage V1a. In this case, the feedback voltage Vfb reaches the voltage V1b at time tc before time tb, and thus the "stop period" is reduced. As such, in a case where the level of the voltage V1 serving as the higher threshold voltage of the comparator circuit 100 is changed in response to the logic level of the control signal CONT, it is possible to adjust the "stop period" as in the case where the resistance value R is changed.

SUMMARY

Hereinabove, the switching power supply circuit 10 according to an embodiment of the present disclosure has been described. The control circuit 104 changes, for example, the level of the feedback voltage Vfb such that the "stop period" decreases, when the "stop period" is longer than the "time period T1" in a light load condition. Accordingly, the control IC 40 is able to increase efficiency in a light load condition while stably operating the switching power supply circuit 10.

Further, for example, the control circuit 104 may be configured to output the "low" control signal CONT such that the "stop period" increases when the "stop period" becomes shorter than the "time period T2". This can increase the "stop period" of the switching power supply circuit 10 that is operating in the burst mode, thereby being able to improve efficiency of the switching power supply circuit 10.

Further, there may be cases where the "stop period" becomes shorter than the "time period T2", for example, due to a transient change in the load 11. In such a case, if the "stop period" is immediately increased in response thereto, the "stop period" may exceed the "time period T1". However, the control circuit 104 according to an embodiment of the present disclosure outputs the "low" control signal CONT such that the "stop period" increases when the "stop period" is shorter than the "time period T2" five times (predetermined number of times) continuously. Accordingly, even if the load 11 changes transiently, the "stop period" can be made longer than the "time period T1", thereby being able to prevent the operation of the control IC 40 from becoming unstable.

Figure 4:
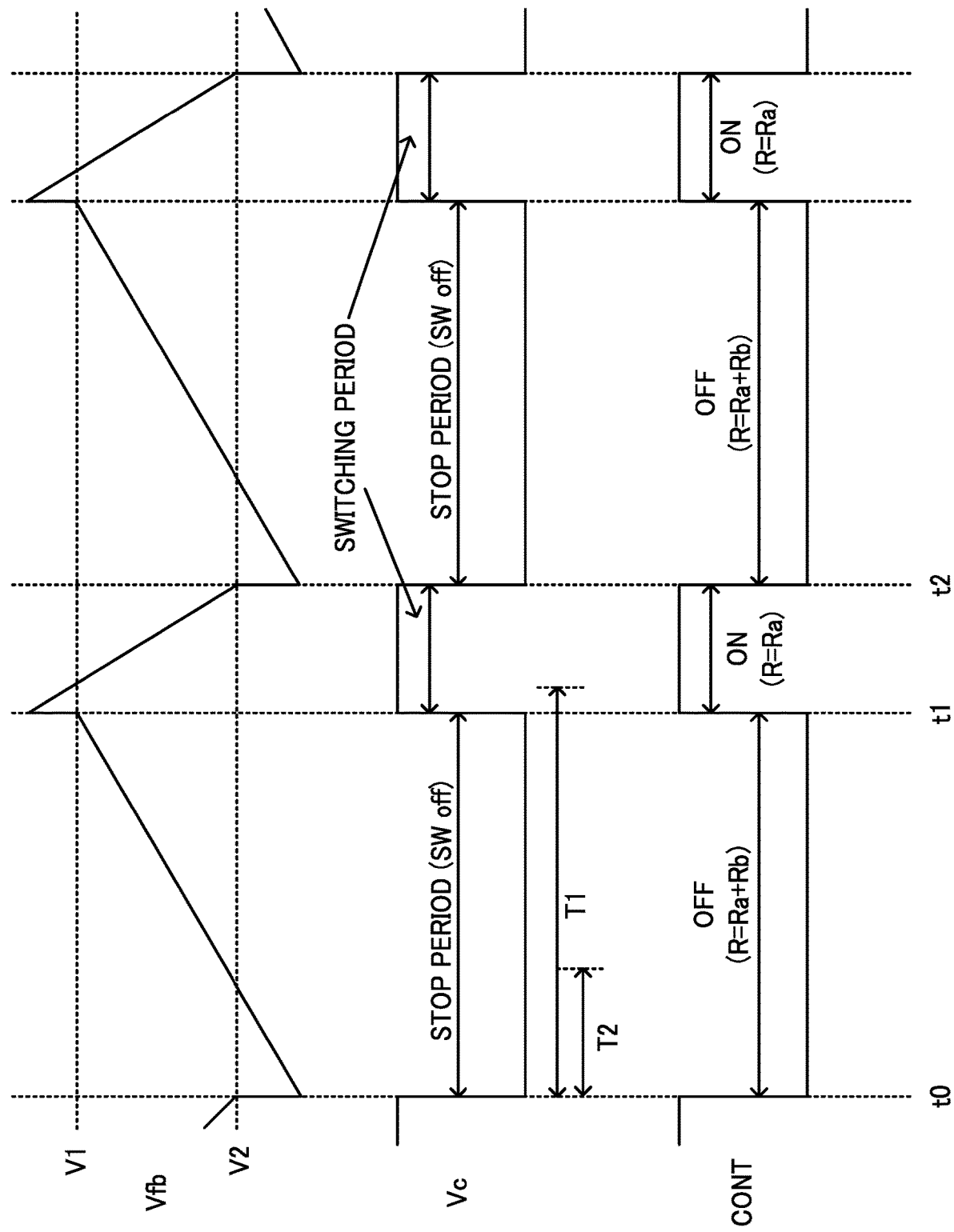
FIG. 4 is a diagram for explaining a burst mode operation.

Further, when the "stop period" is shorter than the "time period T1", the control circuit 104 causes the resistance value R to become smaller thereby making the level of the feedback voltage Vfb higher such that the "switching period" increases (for example, time t1 in FIG. 4). This makes the rising slope of the feedback voltage Vfb steep during the "switching period", thereby being able to reduce the "switching period", which improves efficiency.

Further, the control circuit 104 changes the level of the feedback voltage Vfb by changing the resistance value R of the feedback voltage generating circuit 70.

Further, the control circuit 104 changes the resistance value R by controlling on and off of the switch SW.

Further, the voltage output circuit 210 outputs the voltage V1a, V1b to the comparator circuit 100 in response to the logic level of the control signal CONT. With the use of such a circuit, the "stop period" can be made shorter than the "time period T1".

Further, the drive circuit 77 drives the NMOS transistors 22, 23 in response to the feedback voltage Vfb in the normal mode operation, and drives the NMOS transistors 22, 23 in response to the voltage Vb in the burst mode operation. Accordingly, the control IC 40 can continue to generate the output voltage Vout at the target level even if the load 11 changes from a light load to a heavy load.

Further, the "time period T1" may be, for example, a time period from a time when the level of the power supply voltage Vcc is at the normal level to a time when the level of the power supply voltage Vcc drops to the lowest level at which the control IC 40 stably operates, in the off-state of the switching operation. By setting the "time period T1" as such, the switching power supply circuit 10 can be operated stably.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

For example, in a case where the burst control circuit 200 is used, the control IC 40 may be configured without the switch SW such that the control circuit 104 changes only the level of the voltage V1 to adjust the "stop period". Even with such a configuration, the control IC 40 can increase efficiency in the light load condition while stably operating the switching power supply circuit 10.

Further, the control circuit 104 according to an embodiment of the present disclosure causes the resistance value R to become smaller during the switching period such that the "switching period" decreases, however it is not limited thereto. For example, the control circuit 104 may causes the resistance value R to be a large value, without changing the resistance value R even during the "switching period".

Further, the control IC 40 may include a turn-on circuit that causes the voltage output circuit 102 to output the voltage Vb for forcibly operating the switching operation for a predetermined time period when the control circuit 104 detects that the "stop period" is longer than the "time period T1". By including such a turn-on circuit, even if it is detected that the "stop period" is longer than the "time period T1" and the feedback voltage Vfb does not reach the voltage V1, drop in the power supply voltage Vcc can be prevented.

According to the present disclosure, it is possible to provide a switching power supply circuit capable of increasing efficiency in a light load condition while stably operating.

What is claimed is:

1. A switching control circuit for controlling a power supply circuit that includes
   a transformer including a primary coil provided on a primary side thereof, a secondary coil provided on a secondary side thereof, and an auxiliary coil magnetically coupled to the primary coil or the secondary coil, and
   a transistor coupled to the primary coil,
the switching control circuit being configured to operate based on a voltage from the auxiliary coil and control switching of the transistor, such that the power supply circuit generates an output voltage at a target level on the secondary side and applies the output voltage to a load, the switching control circuit comprising:
- a determination circuit configured to determine whether to shift to a burst mode operation based on whether the load is a light load; and
- a burst control circuit having:
  - a clock circuit configured to measure a stop period during which the switching of the transistor is stopped in the burst mode operation; and
  - a control circuit configured to, upon detecting that the stop period is longer than a first time period, perform control to decrease the stop period.

2. The switching control circuit according to claim 1, wherein the burst control circuit further comprises a comparator circuit configured to,
- receive a feedback voltage corresponding to the output voltage,
- when a level of the feedback voltage reaches a first voltage level in the burst mode operation, output a signal for switching the transistor, and
- when the level of the feedback voltage reaches a second voltage level, output a signal for stopping the switching of the transistor, wherein
- the control circuit performs control to decrease the stop period by outputting a control signal to change at least one of the level of the feedback voltage and the first voltage level.

3. The switching control circuit according to claim 2, wherein
- the control circuit performs control to decrease the stop period by outputting the control signal to maintain a condition for changing the at least one of the level of the feedback voltage and the first voltage level.

4. The switching control circuit according to claim 3, wherein
- the control circuit is further configured to, upon detecting that the stop period is shorter than a second time period a predetermined number of times, change at least one of the level of the feedback voltage and the first voltage level such that the stop period increases, the second time period being shorter than the first time period.

5. The switching control circuit according to claim 2, further comprising a feedback voltage generating circuit that includes a variable resistor, the feedback voltage generating circuit generating the feedback voltage based on a bias current corresponding to the output voltage and a resistance value of the variable resistor, wherein
- the control circuit outputs the control signal to cause the resistance value of the variable resistor in the feedback voltage generating circuit to change according to the stop period.

6. The switching control circuit according to claim 5, wherein the variable resistor includes
- a first resistor,
- a second resistor connected in series with the first resistor, and
- a switch connected in parallel with the second resistor, wherein
- the control circuit outputs the control signal to turn on and off the switch according to the stop period.

7. The switching control circuit according to claim 2, wherein
- the control signal output by the control circuit has a logic level according to the stop period, and
- the burst control circuit further comprises a voltage output circuit configured to receive the control signal and to output a first voltage having a level according to the logic level of the control signal.

8. The switching control circuit according to claim 2, further comprising a drive circuit configured to
- drive the transistor in response to a signal from the burst control circuit in the burst mode operation, and
- drive the transistor in response to the feedback voltage not in the burst mode operation.

9. The switching control circuit according to claim 1, wherein the first time period is a time period corresponding to the voltage from the auxiliary coil.

10. A power supply circuit comprising:
- a transformer including a primary coil provided on a primary side thereof, a secondary coil provided on a secondary side thereof, and an auxiliary coil magnetically coupled to the primary coil or the secondary coil, the power supply circuit generating an output voltage at a target level on the secondary side and applying the output voltage to a load;
- a transistor coupled to the primary coil; and
- a switching control circuit configured to control switching of the transistor based on a voltage from the auxiliary coil, the switching control circuit including
  - a determination circuit configured to determine whether to shift to a burst mode operation based on whether the load is a light load, and
  - a burst control circuit having:
    - a clock circuit configured to measure a stop period during which switching of the transistor is stopped in the burst mode operation, and
    - a control circuit configured to, upon detecting that the stop period is longer than a first time period, perform control to decrease the stop period.

* * * * *